United States Patent [19]
van Buren, Jr.

[11] 4,091,962
[45] May 30, 1978

[54] PANEL HOLE CLOSURE

[75] Inventor: Harold S. van Buren, Jr., Lexington, Mass.

[73] Assignee: TRW Inc., Cleveland, Ohio

[21] Appl. No.: 817,461

[22] Filed: Jul. 20, 1977

[51] Int. Cl.² .............................................. B65D 45/16
[52] U.S. Cl. ................................... 220/326; 220/307; 220/323
[58] Field of Search ............. 220/307, 308, 326, 323, 220/352; 24/213 CS

[56] References Cited
U.S. PATENT DOCUMENTS

| | | | |
|---|---|---|---|
| 3,018,535 | 1/1962 | Griffin | 220/326 |
| 3,944,107 | 3/1976 | Wallace et al. | 220/326 |

Primary Examiner—George T. Hall
Attorney, Agent, or Firm—James R. O'Connor; Martin J. O'Donnell; Thomas C. O'Konski

[57] ABSTRACT

A panel hole closure is composed of a rigid plate having an integral array of resilient fingers projecting from one surface of the plate inboard of the plate rim. A integral stiffener is provided for each finger which stiffens the finger against inward deflection toward the axis of the plate so that once the closure is seated in a panel aperture, it is difficult to dislodge. A plastic sealing ring encircling the plate rim may be melted and flow to provide a fluid-tight seal between the closure plate and panel.

13 Claims, 5 Drawing Figures

PANEL HOLE CLOSURE

BACKGROUND OF THE INVENTION

This invention relates to an improved closure for covering and sealing an aperture in a panel.

As a general practice, various panels as well as the floor pan of an automobile body are formed with relatively large apertures which permit liquid coating such as paint, primer and rust inhibitor to drain from the panels after the panels have been dipped in the liquid. Then these holes are covered and sealed to prevent dirt, moisture, exhaust fumes and the like from entering the vehicle when in use.

Conventionally, these closures take the form of a flat metal plate or cover which is secured to the panel by means of screws or by resilient fingers which project through and resiliently engage the aperture wall. The closure usually also includes a gasket ring extending around the plate rim to provide a fluid-tight seal between the plate and the panel. In some cases, the ring is made of a material which melts to some degree and flows when the panel is heated to a relatively high temperature as when the panel is baked after it is primed or painted. The ring material melts sufficiently to flow between and adhere to those surfaces to provide a seal and inhibit relative movement between the two. Examples of such closures are described in U.S. Pat. No. 3,944,107 and British Pat. No. 1,390,125.

The securement of the closures to the panels by means of screws takes a relatively long time and therefore it is a relatively costly step in the vehicle assembly process considering the number of such drain openings that have to be closed in each vehicle. On the other hand, closures having sprung fingers, clips, or other such resilient retaining projections have not proven to be entirely satisfactory either. This is because such resilient projections tend to be too flexible in the inward direction so that they bend away from the aperture wall when the vehicle panel is jounced and bounced in normal use. Resultantly, the closure is partially or completely knocked out of the aperture permitting ingress of dirt, moisture and fumes. Furthermore, the sealing ring cannot be relied on to prevent dislodgement of these closures because the adhesion between the ring material and the closure and panel surfaces is not strong enough to withstand the vibrations sustained by the panel when, as is usually the case, those surfaces are oily and dirty.

Also in some applications, it is desirable for the closure plate and resilient retaining legs to be stamped and formed from a single piece of material for cost reasons. A cold rolled steel is an acceptable material for the closure plate because it is relatively strong and rigid. However as that material is not known for its resilience, it is not a particularly desirable material for the closure retaining fingers. Therefore such one-piece closures are particularly susceptible to being knocked out of the panels in which they are installed.

SUMMARY OF THE INVENTION

Accordingly the present invention aims to provide an improved closure for covering and sealing an aperture in a panel.

Another object of this invention is to provide a closure for a panel aperture which does not become disengaged from the panel even in a high vibration environment.

Still another object of the invention is to provide a closure for a panel aperture which maintains a fluid-tight seal between the closure and the panel.

A further object of the invention is to provide a closure for a panel drain opening that can be installed quickly and easily without any special tools or equipment.

Yet another object of the invention is to provide a panel opening closure having retaining fingers that are unusually resistant to inward flexure after installation of the closure.

Other objects will, in part, be obvious and will, in part, appear hereinafter.

The invention accordingly comprises the features of construction, combination of elements and arrangement of parts as exemplified in the following detailed description, and the scope of the invention will be indicated in the claims.

In general, the present closure member comprises a flat plate that is similar to and somewhat larger than the panel aperture being covered. Projecting from one surface of the plate is an array of resilient projecting fingers which are arranged and adapted to project through and resiliently engage the aperture wall. The fingers can be pinned or welded to the plate. More preferably, however, the plate and fingers are formed integrally from a single metal stamping. Also the closure includes a plastic sealing ring extending around the rim of the plate which flows at the normal paint baking temperature to which the panels are subjected to provide a fluid-tight seal between the closure and the panel.

In accordance with the present invention, the closure fingers are formed with webs or extensions to the plate at their inboard sides so that they resist bending moments inward or away from the aperture walls. Consequently once the closure is snapped in place, the fingers are particularly difficult to dislodge from the aperture wall and therefore they provide an especially strong, wholly mechanical securement between the closure plate and the panel.

When the panel is subjected to an elevated temperature for baking the paint thereon, the closure sealing ring melts and flows around the closure plate filling any cracks and gaps between the plate and the panel thus assuring a fluid-tight seal between those two members. Yet it should be understood that the closure relies primarily on its specially-formed fingers, not sealing ring adhesion, to maintain its securement to the panel. Therefore, the overall integrity of the closure is maintained even though the panel may be shaken violently under particularly bumpy road conditions.

Thus the present closure is relatively inexpensive to make and use since it can be formed from a single metal stamping and requires no particular expertise or tools for its installation. Yet once the closure is seated in place, it does not tend to become dislodged, thus permanently sealing out dirt, moisture and fumes from the panel interior.

BRIEF DESCRIPTION OF THE DRAWING

For a fuller understanding of the nature and objects of the invention, reference should be had to the following detailed description taken in connection with the accompanying drawing, in which.

DESCRIPTION OF THE PREFERRED EMBODIMENTS

Figure 1:
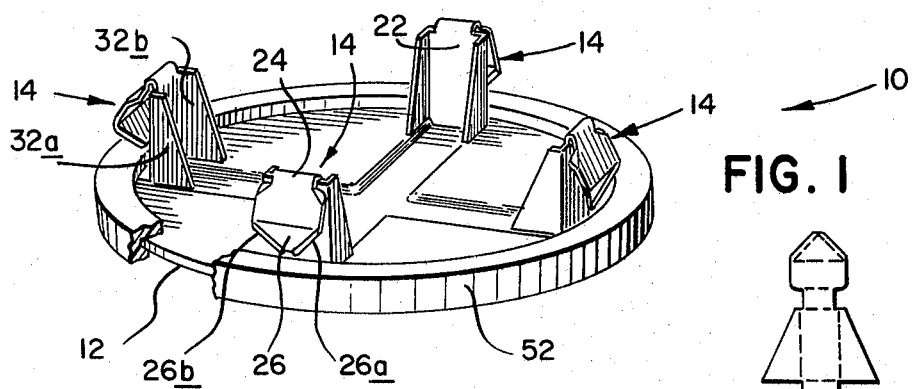
FIG. 1 is a perspective view with parts cut away of a panel aperture closure made in accordance with this invention.
Figure 3:
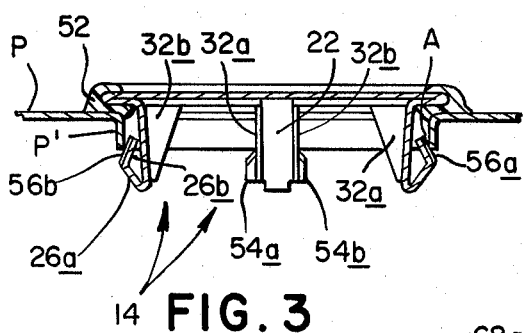
FIG. 3 is an elevational view in section of the FIG. 1 closure mounted in a panel aperture.

Referring now to FIG. 1 of the drawing, the improved closure member indicated generally at 10 comprises a flat plate 12 whose size and shape depends upon the size and shape of the panel aperture which it is designed to close. Typically plate 12 is made round or oblong. The plate is made of a suitable strong, rigid, rust-resistant material such as cold-rolled galvanized steel. Projecting out from one surface 12a of plate 12 is an array of flexible, resilient fingers indicated generally at 14. In the illustrated closure, there are four such fingers positioned every 90° around the plate, although in particular applications the array may include as few as two fingers 14 or a great many fingers that are positioned diametrically opposite one another on plane 12. The fingers 14 are intended to resiliently engage the wall P' of an aperture A in a panel P as illustrated in FIG. 3. In the illustrated example, the aperture A is round and flanged so that wall P' comprises a circular collar extending around the perimeter of the aperture. Accordingly, the finger portions which engage wall P' are spaced from the center or axis of plate 12 by distances somewhat greater than the diameter of aperture A. Each finger 14 comprises a generally rectangular tab 22 having one edge connected to the plate surface 12a just inboard of its rim. The opposite edge of tab 22 is connected by way of a short neck 24 to an arrow-shaped head or clip 26. Actually neck 24 is folded so that head 26 is located outboard of tab 22 and points toward plate 12. Also head 26 is bowed outwardly about a horizontal line 28 between a rectangular head portion 26a and a triangular head portion 26b.

Integral with the side edges of the tab 22 are a pair of generally triangular struts 32a and 32b. The struts are oriented at right angles relative to body 22 so that they extend generally toward the center of plate 12 with their short legs abutting the plate surface 12a. Thus they oppose bending moments tending to deflect the fingers inward toward the center of plate.

Figure 2:
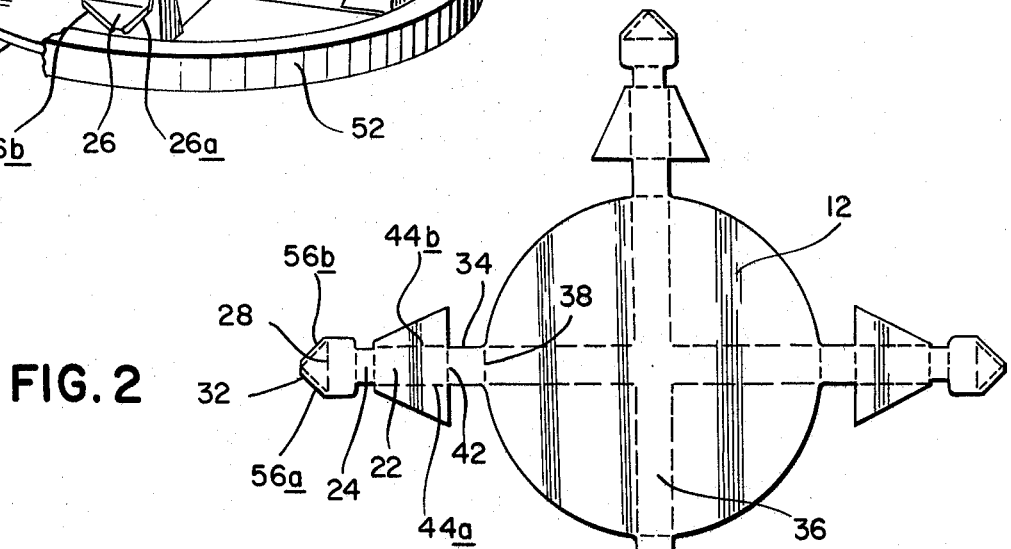
FIG. 2 is a plan view of the metal stamping from which the FIG. 1 closure is made.

The plate 12 and fingers 14 are conveniently constructed integrally from the single metal stamping illustrated in FIG. 2. The portions of the FIG. 2 stamping corresponding to the elements described in connection with FIG. 1 carry the same identifying numerals.

Each tab 22 is connected to the rim of plate 12 by a short, generally rectangular leg 34. Legs 34 are located 90 degrees apart around plate 12. Furthermore, during the stamping operation, the legs 34, tabs 22, necks 24, heads 26 and wings 32a, 32b, as well as the portions 36 of plate 12 extending diametrically between legs 34 are depressed into the plane of the drawing, FIG. 2, relative to the remainder of the plate 12 by an amount approximately equal to the thickness of plate 12.

During the forming operation, each leg 34 is bent at its boundary 38 with the plate so that it lies flush against the plate in a depressed portion 36. Then each tab 22 is bent at right angles to the plate at its boundary 42 with leg 34. Also the struts 32a and 32b are bent inward along their boundaries 44a and 44b with body 22 so that they lie parallel to the sides of the associated depressed portion 36. Finally, each neck 24 is bent and the associated head 26 is bowed along line 28 to form the finished fingers 14 illustrated in FIG. 1.

The depressed portions 36 thus accommodate the thickness of the legs 34 and thus assure that the bottom edges of the tabs 22 and struts 32a, 32b are coplanar with plate surface 12a. Accordingly, when the closure is installed in a panel aperture as shown in FIG. 3, the plate lies flush against the panel surface all around its perimeter. The depressed portions 36 also help to rigidify plate 12, making it more resistant to bending and twisting forces.

Referring again to FIG. 1, preferably closure 10 includes a sealing ring 52 that extends around the rim of plate 12 on both sides of the plate. The ring 52 is made of a suitable plastic material that flows when heated to the temperature to which the panel P is subjected during the customary baking process, typically on the order of 325 degrees F. A suitable material for this purpose is an ethylene vinyl acetate copolymer with an organic acid tripolymer. This plastic material melts in about ten minutes when subjected to a temperature of 250° F. and in about four minutes when exposed to a temperature of 300° F. Furthermore, this material adheres relatively well to metal surfaces and forms an excellent seal. The sealing ring 52 can either be sprung into position onto the rim of plate 12 or it can be insert-molded onto the plate using well-known techniques.

Referring now to FIG. 3, the closure 10 is installed in panel aperture A simply by inserting fingers 14 into the aperture and pressing plate 12 toward the panel. Ideally, the opposite corners 54a and 54b (FIG. 1) of each head portion 26a are bent inwardly to form flats which help to center the fingers on lip P' and facilitate pressing the fingers into aperture A. As the fingers are pressed home, their heads 26 are deflected inwardly about their necks 24. Since those necks are quite short and relatively wide, the fingers are quite stiff at those points. On the other hand, the struts 32a and 32b extending between the tabs 22 and plate 12 prevent the relatively long tabs from bending inwardly so that each finger despite its relatively long length is quite stiff and resistant to inward bending moments.

As soon as the head portions 26b project beyond the rim of flange P', the heads spring radially outward so that the head portions 26b, and more particularly their angled edges, resiliently engage behind the rim of flange P'. Preferably, the converging edge margins 56a and 56b of these head portions are bent outwardly when the closure is formed so that they present sharp corners to the rim of the flange P' which slice into the rim along lines oblique to the axis of the closure. The interfitting engagements between the finger edges and the flange rim together with the stiffening struts 32a and 32b strongly resist forces tending to dislodge the closure from the aperture.

With the closure 10 properly seated over the aperture, the panel can be subjected to the usual baking operation. At the temperature incurred, the sealing ring 52 melts and flows all around the boundary between plate 12 and the panel filling any gaps, cracks and irregularities in those opposing surfaces and adhering to those surfaces forming a fluid-tight seal. However, because of the particularly effective mechanical engagement between the closure fingers 14 and the flange P', there need be no particular reliance on the adhesion of the sealing ring material to prevent the closure from being dislodged from the aperture with the result that the integrity of the closure is maintained even if the vehicle panel is violently shaken and bumped in use.

Figure 4:
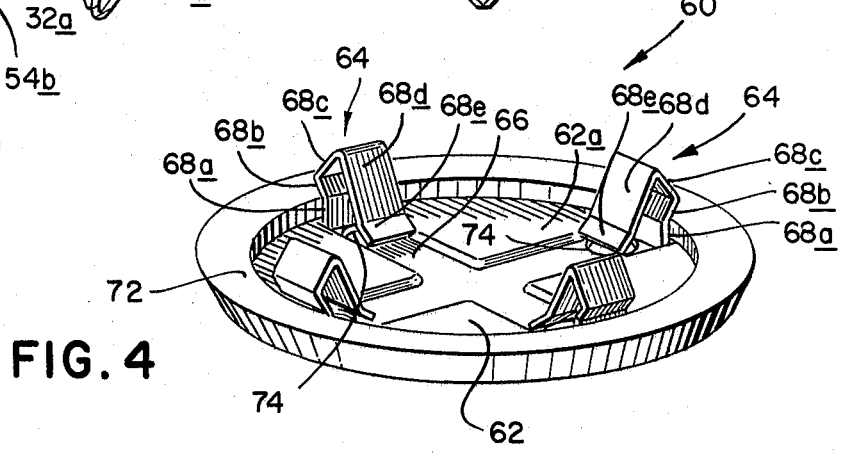
FIG. 4 is view similar to FIG. 1 of another closure embodiment.
Figure 5:
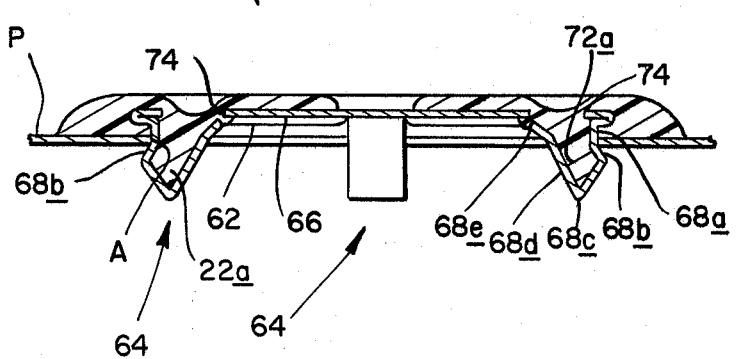
FIG. 5 is an elevational view in section illustrating the FIG. 4 closure mounted in an aperture panel.

Refer now to FIGS. 4 and 5 of the drawing which illustrate another closure embodiment shown generally at 60 whose sealing ring material actually contributes to the stiffening of the closure fingers after the closure is seated. Closure 60 comprises a plate 62 similar to plate 12 and an array of flexible resilient fingers 64 projecting out from the plate surface 62a. The closure plate and fingers are conveniently formed integrally with the plate in the same manner described above in connection with FIGS. 1 and 2. The fingers 64 are more or less identical, each finger having its root in a depression 66 in plate 62 just inboard of the plate rim.

Each finger consists of a generally rectangular tab 68 that is bent inwardly on itself. It has a portion 68a that extends up generally perpendicular to plate 62. The top edge of portion 68a is connected by way of a short, upwardly angled segment 68b to a V-shaped nose 68c that projects away from plate 62. The inboard side 68d of the nose extends downwardly, inwardly toward plate 62 and its end margin 68e is bent inwardly toward the axis of plate 62 and terminates at or just above the bottom of depression 66. A sealing ring 72 made of the same plastic material described above in connection with the FIG. 1 embodiment extends around the rim of plate 62, overlapping both surfaces of the plate. Each finger 64 is shaped so that the distance between the upper edge of the outwardly angled finger portion 68b and the upper face of the sealing ring is slightly greater than the thickness of the panel P on which the closure is to be installed.

Referring to FIG. 5, the closure 60 is installed by inserting the fingers 64 into aperture A so that they engage the wall of the aperture. In this example, the aperture A is not flanged so that the fingers engage the edge of the opening. Pressure on the closure plate 62 springs the fingers 64 toward the axis of the closure until the outwardly projecting portions 68b of the fingers project beyond the inner edge of the aperture wall whereupon the fingers snap back and resiliently clamp the panel between the finger portions 68b and the sealing ring 72.

Preferably also, the plate 62 of closure 60 is formed with small openings 74 in the depression 66 directly opposite each finger 64. These openings 74 permit the sealing ring 72 material, when melted, to flow through the plate and into the pockets formed between the sections 68a and 68e of each finger as indicated at 72a in FIG. 5. The mass of plastic material 72a thereby stiffens the finger sections 68b against any inward deflection and possible disengagement from the wall of aperture A. The material mass 72a also fills and occupies the small clearance between the edge of finger portion 68e and plate 62 thereby further resisting any inward deflection of the finger sections 68b.

The sealing ring material also completely fills and covers openings 74 as well as providing a fluid-tight seal all around the perimeter of the closure. Of course, if the plate 62 includes openings 74, the sealing ring should overlie those openings so that the material will flow readily through the openings and under the fingers. Thus as best seen in FIG. 5, the portion 72b of the sealing ring that is received over the outer or exposed surface of plate 62 extends radially inward well beyond openings 74 toward the axis of the plate and indeed may completely cover that surface of the plate.

Thus, the panel hole closures made in accordance with this invention are not prone to dislodgement even when the panels are subjected to unusually heavy shocks and vibration. On the contrary, they remain in sealing engagement with the panel even when exposed to severe road hazards. At the same time, the closures are relatively inexpensive to make and install since they can be formed out of unitary stamped metal parts and be seated in the panel apertures by hand.

It will thus be seen that the objects set forth above among those made apparent from the preceding description are efficiently attained, and since certain changes may be made in the above constructions without departing from the scope of the invention, it is intended that all matter contained in the above description or shown in the accompanying drawing be interpreted as illustrative and not in a limiting sense.

It is also to be understood that the following claims are intended to cover all of the generic and specific features of the invention herein described.

I claim:
1. A panel hole closure comprising
   A. a plate,
   B. a plurality of flexible, resilient fingers projecting from one surface of the plate, said fingers being distributed about the center of the plate inboard of its rim,
   C. means associated with each finger for stiffening said finger against inward deflection toward the axis of the plate, and
   D. a sealing ring extending around the rim of the plate, said sealing ring being made of a plastic material which flows upon being subjected to a selected elevated temperature.
2. The closure defined in claim 1 wherein the sealing ring includes an ethylene vinyl acetate copolymer.
3. The closure defined in claim 1 wherein the stiffening means comprises one or more struts extending from elevated locations on the finger an appreciable distance from the finger connection to the plate surface toward locations on the plate surface inboard of said connection.
4. The closure defined in claim 3 wherein
   A. each finger comprises
      1. a flat tab projecting out from the plate surface, and
      2. a clip resiliently connected to the free end of the tab, said clip extending outboard of the tab and being arranged to engage behind a wall of a panel aperture through which the fingers are projected as the closure is seated over the panel aperture, and
   B. the struts comprise generally triangular wings integral with the side edges of the tab and extending to said inboard plate locations.
5. The closure defined in claim 4 wherein each clip has converging edge margins which are bent outwardly away from the axis of the plate so as to present sharp edges which score into the wall of the aperture, when the clips resiliently engage that wall upon the seating of the closure over the aperture.
6. The closure defined in claim 3 wherein
   A. each finger comprises
      1. a flat tab projecting out from the plate surface, and

2. means defining an outboard projection at an elevated location on the tab, and
B. the strut comprises a tab extension extending from the free end of the tab toward a said inboard plate location.

7. The closure defined in claim 6 and further including
A. means defining openings in the plate at locations therein opposite each said tab and its extension.
B. a sealing ring extending around the rim of the plate and adjacent said plate openings, said ring being made of a material that flows at selected elevated temperatures.

8. The closure defined in claim 1 wherein the plate, fingers and stiffening means are formed integrally from a single metal stamping.

9. The closure defined in claim 8
A. further including means defining a depression in the plate surface at the connection of each said finger to the plate surface, and
B. wherein each finger is connected to the plate rim by a tab folded against the plate surface in a said depression.

10. A panel hole closure comprising
A. a plate,
B. a plurality of flexible resilient clips projecting from one surface of the plate, said clips being distributed about the center of the plate inboard of its rim,
C. a body of plastic material connected to said plate, said material being flowable at a selected elevated temperature, and
D. means for conducting said material, when flowable, to said clips so that when the closure is seated over a panel aperture with said clips resiliently engaging the aperture walls and is heated to the selected temperature, the material flows to and collects adjacent to and on said clips thereby stiffening them.

11. The closure defined in claim 10 wherein
A. the conducting means comprise an opening in the plate adjacent the connection of each clip to the plate, and
B. the body comprises a sealing ring extending around the rim of the plate and adjacent each said opening so that, when heated, the material flows through said openings to said clips and also closes said openings and provides a fluid-tight gasket between the plate and the panel.

12. The closure defined in claim 11 wherein each clip comprises a tab that is bent back on itself so as the define a pocket for said ring material opposite the associated plate opening.

13. A panel hole closure comprising
A. a plate,
B. a plurality of flexible, resilient fingers projecting from one surface of the plate, said fingers being distributed about the center of the plate inboard of its rim,
C. means associated with each finger for stiffening said finger against inward deflection toward the axis of the plate, said fingers and stiffening means being formed integrally from a single metal stamping.

* * * * *